(12) United States Patent
Yamamoto

(10) Patent No.: US 6,791,708 B1
(45) Date of Patent: Sep. 14, 2004

(54) PRINT SYSTEM AND REORDER SHEET USED TO THE SAME

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/332,167

(22) Filed: Jun. 14, 1999

(30) Foreign Application Priority Data

Jun. 12, 1998 (JP) .......................................... 10-164743

(51) Int. Cl.[7] .................................................. G06K 1/00
(52) U.S. Cl. ..................... 358/1.18; 358/1.12; 358/487; 358/527
(58) Field of Search ............................... 358/1.18, 1.17, 358/1.6, 1.12, 1.15, 1.16, 487, 527; 355/40, 39, 41; 396/639

(56) References Cited

U.S. PATENT DOCUMENTS 5,936,709 A * 8/1999 Yamamoto .................. 355/406
5,937,107 A * 8/1999 Kazami et al. .............. 382/298
6,017,157 A * 1/2000 Garfinkle et al. ........... 396/639
6,154,295 A * 11/2000 Fredlund et al. ............ 358/487

FOREIGN PATENT DOCUMENTS

| JP | 9-18704 | 1/1997 | |
| JP | 9-182093 | 7/1997 | ............ H04N/9/11 |

* cited by examiner

Primary Examiner—Twyler Lamb
(74) Attorney, Agent, or Firm—Sughrue Mion, PLLC

(57) ABSTRACT

The print system subjects original images to image processing and outputs prints having the original images reproduced thereon. The system outputs a reorder sheet on which the original images, identifying information and original image information are recorded. The system reads out the image processing information of the original images to be reprinted from the storing device using the identifying information and the original image information on the reorder sheet and reproduces the image processing which was employed when prints were produced previously. As a result, reprints on which images similar to those reproduced in simultaneous printing (previous printing) can be preferably output by a simple operation.

9 Claims, 5 Drawing Sheets

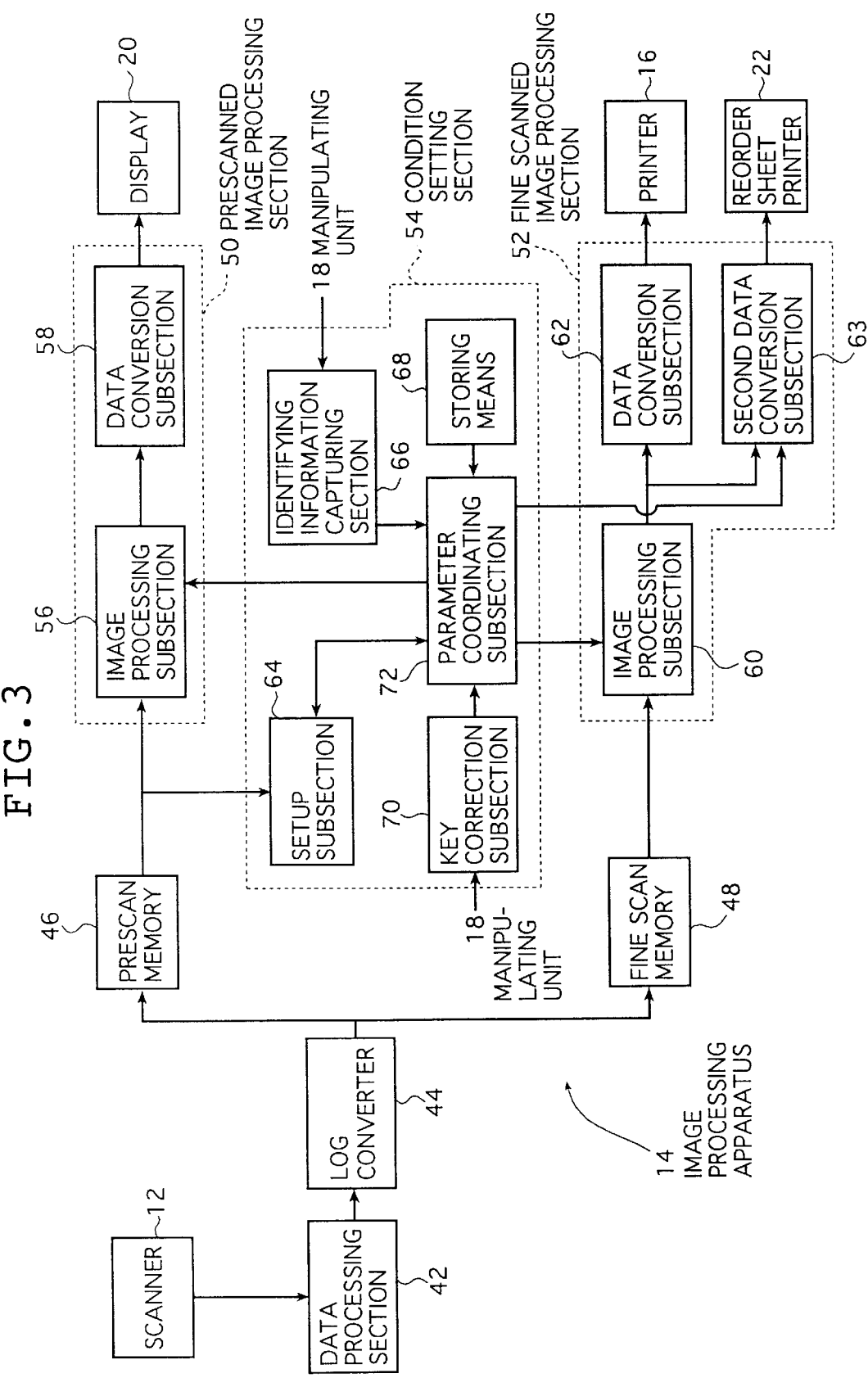

PRINT SYSTEM AND REORDER SHEET USED TO THE SAME

BACKGROUND OF THE INVENTION

The present invention relates to the technical field of a print system for outputting prints (photographs) each having an image and the like which are recorded on a film and reproduced thereon and a reorder sheet used to the print system.

At present, the images recorded on photographic films such as negatives and reversals (which are hereinafter referred to as "films") are printed onto light-sensitive materials (photographic papers) by a technique generally called "direct exposure" (analog exposure) in which the image on a film is projected onto the light-sensitive material for areal exposure.

In contrast, a printer which adopts digital exposure has recently been commercialized. In this "digital photoprinter", the image recorded on a film is read photoelectrically and converted into digital signals, which are subjected to various kinds of image processing to produce recording image data; and a light-sensitive material is scanned and exposed with recording light modulated in accordance with the image data, thereby recording a (latent) image which is output as a print.

In digital photoprinters, the image is converted into digital image data and exposing conditions used in print operation can be determined by processing that image data. Hence, by using such digital photoprinters, the correction of washed-out highlight of images or dull shadow of images due to photography with rear light or an electronic flash, the correction of under- or over-exposure, the correction of the insufficiency of marginal light, sharpening, and various other kinds of image processing, the execution of which by the conventional direct exposure technique has heretofore been impossible or difficult, can be performed with a high degree of freedom. With this operation, prints having higher quality as compared with that of prints made by the direct exposure can be output. In addition, a plurality of images can be composited into a single image or one image can be split into segments or even characters can be composited by the processing of image data. If desired, prints can be output after desired editing/processing is carried out in accordance with a specific application.

The capability of digital photoprinters is by no means limited to outputting the image as a print (photograph) and they enable the image data to be supplied to computers or stored in recording mediums such as floppy disks and so forth; thus, with digital photoprinters, the image data can be used in various applications other than photography.

Having these features, the digital photoprinter is composed of the following three basic parts; a scanner (image reading apparatus) which reads the image recorded on a film with a CCD sensor or the like photoelectrically; an image processing apparatus which performs various kinds of image processing (image data processing) to the image data read with the scanner to thereby produce output image data, that is, to determine the conditions for exposing a light-sensitive material which is output as prints; and a printer (image recording apparatus) which exposes a light-sensitive material with recording light such as optical beams or the like which are modulated in accordance with the image data determined by the image processing apparatus and subjects the exposed light-sensitive material to preset development processing and outputs the light-sensitive material as the (finished) prints.

Incidentally, when prints are made from a film, it is often requested to make extra prints by printing the image of the same frame a plurality of times. In the extra prints, it is required that the color and density of the images of prints which were output previously (ordinarily, prints output in simultaneous printing) are matched with those of the images reproduced in the prints (reprints) output as the extra prints.

However, the color and density of the images of the previous prints are often different from those of the images of the reprints due to the difference between print systems and the difference between the judgements and operations of operators, about which customers often make a complaint.

SUMMARY OF THE INVENTION

Accordingly, it is an object of the present invention to solve the problems of the prior art and to provide a print system for outputting prints on which the images recorded on a photographic film and the images recorded with a digital camera and the like are reproduced, the print system being arranged such that it permits the reorder from a customer, that is, the request from the customer for extra prints and the like to be processed simply and moreover can output reprints having images reproduced thereon whose color and density are preferably matched with those of the images of previous prints.

It is another object of the present invention to provide a reorder sheet which can be used to the print system and which is capable of ordering or requesting reprints or extra prints from customer in the easy and convenient manner.

To achieve the above object, the present invention provides a print system for subjecting original images to image processing and outputting prints having the original images reproduced thereon, comprising the steps of: setting identifying information according to one order of print production; storing the identifying information, image processing information which was applied to each of the original images, and information of the respective original images of the one order in storing means by causing them to correspond to each other; outputting a reorder sheet on which the original images of the one order, the identifying information and the information of the respective original images of the one order are recorded; reading out, when original images previously printed are output as reprints, the image processing information of the original images to be reprinted from the storing means using the identifying information and the information of the respective original images of the one order which have been recorded on the reorder sheet; and basically reproducing the image processing which was employed when prints were produced previously using the read-out image processing information.

It is preferable that the identifying information is arranged as a barcode, and recorded on the reorder sheet and the image processing information of the original images is read out from the storing means by reading the barcode.

Further, it is preferable that the image processing information includes at least one of the kinds of image processing steps applied, the sequence of the image processing steps and image processing conditions.

Furthermore, it is preferable that the original images are reproduced to the prints by digitally recording an image based on image data obtained by the image processing, and the image data obtained by the image processing is stored in the storing means.

To achieve the above another objet, the prevent invention provides a reorder sheet which is used to a print system for subjecting original images to image processing and outputting prints having the original images reproduced thereon; comprising original images of one order of print production recorded thereon and information of respective original images of said one order recorded thereon.

It is preferable that the reorder sheet further comprises identifying information according to the one order.

BRIEF DESCRIPTION OF THE DRAWINGS

FIG. 3 is a block diagram of an embodiment of an image processing apparatus of the digital photoprinter shown in FIG. 1;

DETAILED DESCRIPTION OF THE INVENTION

A print system and a reorder sheet used to the print system of the present invention will be described below in detail with reference to a preferred embodiment shown in the accompanying drawings.

Figure 1:
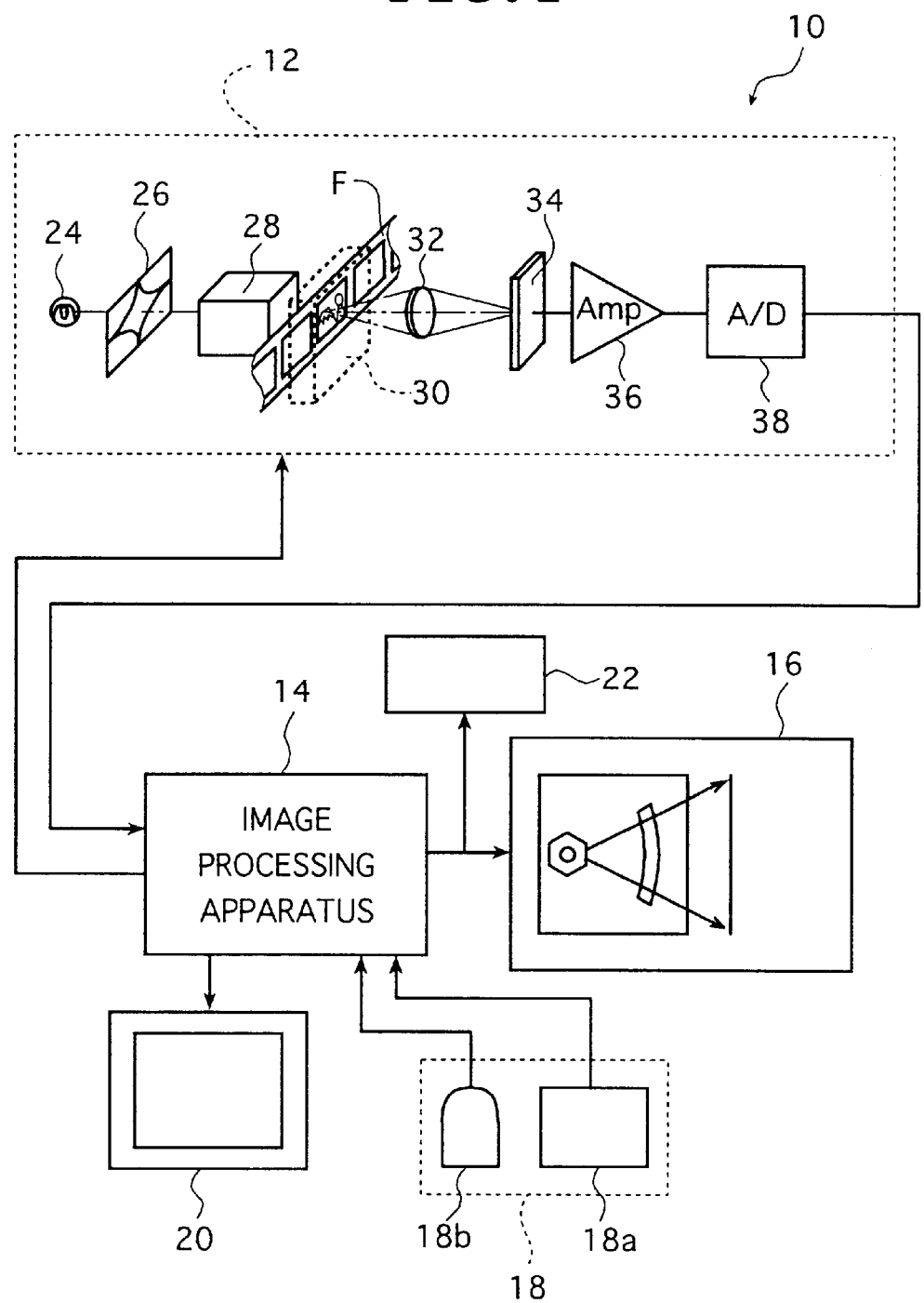
FIG. 1 is a block diagram of an embodiment of a digital photoprinter to which a print system of the present invention is applied.

FIG. 1 shows a block diagram of an embodiment of a digital photoprinter according to the print system of the present invention.

The digital photoprinter generally indicated by 10 in FIG. 1 (hereinafter simply referred to as the "photoprinter 10") basically comprises: a scanner (image reading apparatus) 12 which reads the image recorded on a film F photoelectrically; an image processing apparatus 14 which carries out image processing of the thus read image data (image information), and which allows for manipulation, control and otherwise of the photoprinter 10 in its entirety; a printer 16 which exposes a light-sensitive material (photograph paper) imagewise with optical beams modulated in accordance with the image data supplied from the image processing apparatus 14, develops the light-sensitive material and outputs it as a (finished) print; and a reorder sheet printer 22 which outputs a reorder sheet of the present invention.

Connected to the image processing apparatus 14 are a manipulating unit 18 having a keyboard 18a and a mouse 18b to enter (set) various conditions, to select and issue a command for a specific processing step and to enter commands for color/density correction and the like, as well as a display 20 which displays the image read with the scanner 12, various kinds of manipulative instructions, and screens on which various conditions are set and/or registered.

The scanner 12 is an apparatus for reading the image recorded on the film F or the like photoelectrically frame by frame. It comprises an illuminant 24, a variable stop 26, a diffuser box 28 with which the reading light incident on the film F is made uniform on the plane of the film F, an imaging lens unit 32, an image sensor 34 which has line CCD sensors corresponding to the reading of respective R (red), G (green) and B (blue) images, an amplifier 36, and an A/D (analog to digital) converter 38.

The illustrated photoprinter 10 has dedicated carriers available which can be selectively mounted on the housing of the scanner 12 depending upon such factors as the type and size of films, for example, films for an Advanced Photo System and negatives (or reversals) of 135 size, the physical form of the films, e.g. whether they are a strip or a slide. By changing carriers, the photoprinter 10 is capable of handling and processing various kinds of films. An image (frame) used to create a print is transported to a preset reading position by the carrier.

In the scanner 12 arranged as described above, when the image recorded on the film F is read, light emitted from illuminant 24 is adjusted in quantity through the variable stop 26, then is incident on the film F which is held at the preset reading position by a carrier, through which it is transmitted to produce projected light which carries the image recorded on the film F.

Figure 2A:
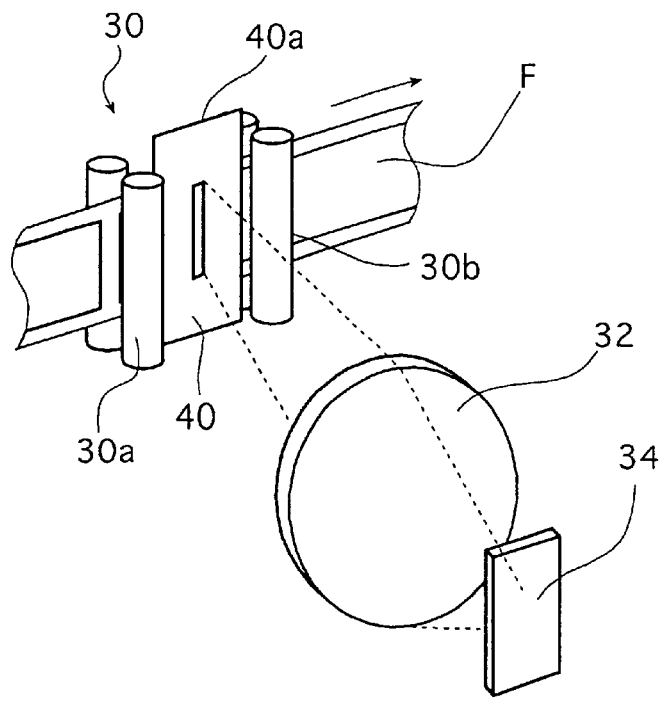
FIG. 2A is a conceptual view of a scanner mounted on the digital photoprinter shown in FIG. 1

As schematically shown in FIG. 2A, the carrier 30 of the illustrated example includes transport rollers pairs 30a and 30b and a mask 40 having a slit 40a. The transport rollers pairs 30a and 30b are disposed on the opposite sides of the preset reading position in an auxiliary scanning direction. They transport the film F with its lengthwise direction being parallel to the auxiliary scanning direction which is perpendicular to a direction in which the line CCD sensors of the CCD sensor 34 extend (main scanning direction) while holding the film F at the preset reading position. The slit 40a of the mask 40 defines the light projected from the film F so that the light has a preset slit shape, is located in registry with the reading position and extends in the main scanning direction.

Being held at the reading position by the carrier 30, the film F is illuminated with the reading light which is incident thereon while transported in the auxiliary scanning direction. Consequently, the film F is subjected to two-dimensional slit scan with the reading light through the slit 40a extending in the main scanning direction, whereupon the image of each frame recorded on the film F is read.

As described above, the reading light passes through the film F held by the carrier 30 and is made to the projected light which carries the image recorded on the film F. The projected light is processed with the imaging lens unit 32 and form s a focused image on the light receiving plane of the image sensor 34.

Figure 2B:
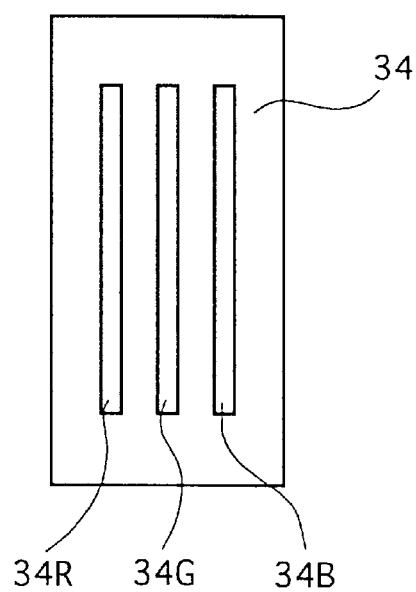
FIG. 2B shows a conceptual view of an image sensor disposed to the digital photoprinter shown in FIG. 1.

As shown in FIG. 2B, the image sensor 34 is a so-called 3-line color CCD sensor comprising a line CCD sensor 34R for reading R image, a line CCD sensor 34G for reading G image, and a line CCD sensor 34B for reading B image. The respective line CCD sensors extend in the main scanning direction as described above. The light projected from the film F is separated into the three primary colors R, G and B by means of the image sensor 34 and read photoelectrically.

The signals output from the image sensor 34 is amplified with the amplifier 36, converted into digital signals with the A/D converter 38 and thereafter sent to the image processing apparatus 14.

The scanner 12 reads the image recorded on the film F twice. That is, the scanner 12 carries out prescan for reading the image at a low resolution and fine scan for obtaining the image data of an output image.

The prescan is carried out under prescan reading conditions which were set beforehand to read the images of the entire film F to be read with the scanner 12 so that the image sensor 34 can read the images without being saturated. In contrast, the fine scan is carried out under fine scan reading conditions which are set to each of frames from prescan data so that the image sensor 34 is saturated at a density which is a little lower than the minimum density of each image (frame).

Therefore, the signals output in the prescan are different from those output in the fine scan in a resolution and an output level.

It should be noted that in the photoprinter 10 of the present invention, the scanner is by no means limited to a type that relies upon the slit scan described above but that it may make use of areal exposure by which the entire surface of the image in one frame is read at a time.

In this case, for example, an area CCD sensor is used, a means for inserting R, G and B color filters is interposed between the illuminant 24 and the film F, and the image recorded on the film F is read with the area CCD sensor by sequentially inserting the R, G and B color filters so that image is separated to the three primary colors.

The photoprinter 10 according to the present invention is not limited to the one provided with the scanner for reading the image recorded one the film F photoelectrically. That is, the photoprinter 10 may receive image data carrying images from various kinds of image data supply sources and create prints on which the images of the image data are reproduced. Exemplified as the image data supply sources are various kinds of image reading means, image recording means, image data storing means, and so forth such as an image reading apparatus for reading a reflecting original, an image recording device such as a digital camera, digital video camera and the like, a communication means such as a LAN (Local Area Network), computer communication network and the like, a medium (recording medium) such as a memory card, MO (magneto-optical recording medium) and so forth.

As described above, the signals (image data) output from the scanner 12 are supplied to the image processing apparatus 14.

FIG. 3 shows a block diagram of the image processing apparatus 14. As shown in FIG. 3, the image processing apparatus 14 (hereinafter, simply referred to as "processing apparatus 14") comprises a data processing section 42, a Log converter 44, a prescan (frame) memory 46, a fine scan (frame) memory 48, a prescanned image processing section 50, a fine scanned image processing section 52 and a condition setting section 54.

FIG. 3 mainly shows the components which are related to image processing. In addition to the components shown in FIG. 3, the processing apparatus 14 includes a CPU which controls and manages the photoprinter 10 in its entirety including the processing apparatus 14, a memory which stores the information necessary for the operation of the photoprinter 10, a means which determines the stop value of the variable stop 26 and the accumulating time of the image sensor 34, and so forth. Further, the manipulating unit 18 and the display 20 are connected to the associated components via the CPU and related parts (i.e., CPU bus).

The output signals associated with R, G and B which have been delivered from the scanner 12 are first processed in the data processing section 42 where they are subjected to preset processes including DC offset correction, darkness correction, shading correction and so forth. Subsequently, the resulting output signals are subjected to Log conversion in the Log converter 44. The thus converted digital image data is stored in the prescan memory 46 if it is prescanned image data (prescanned data) and in the fine scan memory 48 if it is fine scanned image data (fine scanned data), respectively.

The prescanned data stored in the prescan memory 46 is processed in the prescanned image processing section 50 and the fine scanned data stored in the fine scan memory 48 is processed in the fine scanned image processing section 52, respectively.

The prescanned image processing section 50 comprises an image processing subsection 56 and a data conversion subsection 58. Whereas, the fine scanned image processing section 52 comprises an image processing subsection 60, a data conversion subsection 62 and a second data conversion subsection 63.

The image processing subsection 56 of the prescanned image processing section 50 and the image processing subsection 60 of the fine scanned image processing section 52 are both a site at which the image (image data) read with the scanner 12 is subjected to a preset image processing in accordance with the image processing conditions set by means of the condition setting section 54 which will be described below in detail. Except for the pixel density of the image data to be processed, the two processing subsections perform essentially the same processing.

The image processing to be performed in the image processing section 56 and the image processing subsection 60 is exemplified by at least one of gray balance adjustment, gradation adjustment, density adjustment, saturation adjustment, sharpness processing, dodging processing, electronic magnification processing, geometric deformation correction, marginal light correction, special finishing such as soft focus finishing, black and white finishing and so forth, red eye correction, and the like.

These corrections may be performed by any known methods by appropriately combining arithmetic operations for image processing, processing with LUTs (look-up tables), matrix (MTX) operations, processing with lowpass filters (LPFs) and the like.

Examples of the correcting methods are as described below. Exemplified as a gray balance adjustment, a density adjustment method and a gradation adjustment method are to use LUTs which are created in accordance with image characteristic values. The correction tables used for these correcting methods are ordinarily created for each of R, G and B colors.

Exemplified as a saturation adjustment method is to use MTX operation.

Exemplified as a sharpness processing method is to divide an image into frequency components; multiplying a luminance signal obtained from middle and high frequency components by a sharpness gain (degree of sharpness correction coefficient); and adding the resultant luminance signal to a low frequency component.

Exemplified as a dodging processing method is to create an unsharp image (data) by obtaining luminance signals by converting image data and subjecting the luminance signals to filter processing; to create a LUT or the like using the unsharp image; to compress or to expand a high density region and a low density region using the image data processed with the LUT or the like, thereby compressing or expanding the dynamic range of an image while holding intermediate gradation so that a dodging effect can be obtained by direct exposure (refer to Japanese Unexamined Patent Publication No. 9-18704 and Japanese Unexamined Patent Publication No. 9-182093).

Exemplified as an electronic magnification processing method is to carry out interpolating operation.

The data conversion subsection 58 of the prescanned image processing section 50 converts the image data having been processed in the image processing section 56 by means of a 3D (three-dimensional)—LUT or the like and supplies it to the display 20 as image data corresponding to the display thereon.

In contrast, the data conversion subsection 62 of the fine scanned image processing section 52 converts the image data (output image data) having been processed in the image processing subsection 60 using a 3D-LUT or the like and supplies it to the printer 16 as image data corresponding to the images recorded thereby.

When prints (which are hereinafter referred to as "simultaneous prints" because they are ordinarily printed simultaneously with the development of a film, and prints other than the simultaneous prints are referred to as reprints) are created for one order (which covers images recorded on one film) whose image processing information is not stored in a storing means 68 to be described later, the second data conversion subsection 63 of the fine scanned image processing section 52 thins out the image data, which has been processed in the image processing subsection 60; and converts the image data into image data corresponding to the images recorded by the reorder sheet printer 22 using a 3D—LUT or the like. At the same time, the second data conversion subsection 63 arranges the images of the respective frames of the film of the one order vertically and horizontally and further adds the image data of identifying information to be described later to each image so as to provide image data to be output to a reorder sheet. Then, the second data conversion subsection 63 supplies the image data to the reorder sheet printer 22. When necessary, the image data of the identifying information is represented by a barcode and the image data of the barcode is added to the above image data.

Figure 4:
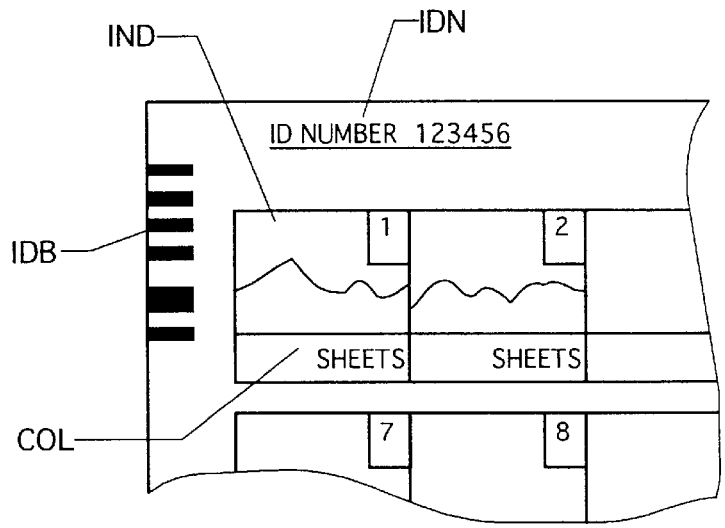
FIG. 4 is a conceptual view of an embodiment of a reorder sheet of the present invention used to the print system of the present invention.

FIG. 4 shows an example of the reorder sheet of the present invention.

In the print system of the present invention, when it is requested to create prints from one film as one order or when one customer requests to create prints at a time as one order, the reorder sheet of the present invention makes a record of the images (index images) of the respective frames of the one order, the frame numbers of the images and identifying information for identifying the one order. In the illustrated example, the reorder sheet makes a record of, as an example, the index images IND of the respective frames of the one order, the frame numbers of the index images IND, columns COL which are disposed below the respective index images IND and in which the number of prints to be created is recorded when a reorder is placed, identifying information IDN (in the illustrated example, ID number) and identifying information IDB which represents the identifying information by a barcode.

In the print system of the present invention, an identifying information capturing subsection 66, which will be described later, creates identifying information for the one order when simultaneous prints are output as well as a reorder sheet, on which the identifying information and the images of the respective frames of the one order are recorded, is output. This operation will be described later in detail. On the other hand, when reprints are output, a customer is requested to submit the reorder sheet on which the frames to be reprinted, the number of the prints to be printed from each frame, and the like are written. The operator inputs the frames to be reprinted, the number of prints to be printed from each frame and the identifying information to the photoprinter 10 (processing apparatus 14) with reference to the reorder sheet. Note, the reorder sheet may be also output when the reprints are created.

The reorder sheet may be output by the printer 16 for outputting prints (photographs) likewise the index prints which are output in an Advanced Photo System.

It is sufficient, however, that the image quality of the index images recorded on the reorder sheet is such a degree that the customer can identify the images. Thus, in the illustrated example, the reorder sheet printer 22 for outputting the reorder sheet is separately provided in order to reduce print cost, image data for outputting the reorder sheet is created in the second data conversion subsection 63, and the reorder sheet is output by the reorder sheet printer 22.

Therefore, any printer may be used as the reorder sheet printer 22 so long as the image quality of images obtained by the printer permits the customer to discriminate the images. Thus, an electronic photo printer, inkjet printer, ink ribbon printer, dot impact printer, heat sensitive recording printer, and so forth may be used. Further, black and white images may be employed for cost reduction because color images are not always required.

In addition, the image data for creating the reorder sheet may be created using prescanned data in place of fine scanned data as necessary.

The reorder sheet is not limited to one sheet for one order. For example, when the number of frames in one order is very large, a plurality of reorder sheets may be output for the one order.

Otherwise, the reorder sheet may be formatted so as to include columns COL, in which the number of prints to be reordered can be written and a column, in which identifying information can be written, and the like. At the time, only the index images IND, the identifying information and further the barcodes IDB are recorded on the thus formatted reorder sheet.

The image processing, which is executed in the prescanned image processing section 50 and the fine scanned image processing section 52, and the image processing conditions, under which the image processing is carried out, are determined in the condition setting section 54.

The condition setting section 54 comprises a setup subsection 64, the identifying information capturing section 66, a key correction subsection 70, a parameter coordinating subsection 72, and a storing means 68 connected to the parameter coordinating subsection 72.

The setup subsection 64 sets various kinds of image processing steps, which are executed in the prescanned image processing section 50 and in the fine scanned image processing section 52, and the image processing conditions, under which the image processing steps are carried out in accordance with prescanned images and instructions issued by the operator when necessary and further using the image processing information stored in the storing means 68 when reprints are output. Then, the setup subsection 64 supplies them to the parameter coordinating subsection 72.

Specifically, when the simultaneous prints are output, the setup subsection 64 creates a density histogram from the prescanned data and calculates image characteristic amounts therefrom such as a mean density, highlight and shadow, LATD (large area transmission density), the maximum density value and minimum density value of the density histogram, and the like to thereby set reading conditions of fine scan. Further, the setup subsection 64 determines image processing steps to be executed and the sequence in which they are executed from the above various kinds of the image processing steps in accordance,with the thus obtained image characteristic amounts and further the instructions of the operator and the like. In addition, the setup subsection 64 determines the image processing conditions under which the image processing steps are carried out and supplies the conditions to the parameter coordinating subsection 72.

On the other hand, when reprints are output, the setup subsection 64 sets fine scan reading conditions by calculating image characteristic amounts and the like using the prescanned data similarly to the above. Further, the setup subsection 64 reproduces the image processing, which was carried out in the simultaneous printing, using, in addition to the image characteristic amounts and the like, the image processing information, which was supplied from the parameter coordinating subsection 72 to be described later, of the frames from which reprints are created, and supplies the thus reproduced image processing to the parameter coordinating subsection 72.

When the print conditions in the reprinting is different from those in the simultaneous printing, the image processing conditions in the reprint may be changed when necessary.

For example, when the print size and the like in the reprinting are different from those in the simultaneous printing, image processing conditions such as sharpness processing and the like which relate to an image structure (for example, a sharpness gain) may be changed according to the print size.

The key correction subsection 70 calculates the amounts of correction of images in accordance with the instructions for correcting the color, density, gradation and the like of the images which were input through the keyboard 18a and the mouse 18b of the manipulating unit 18 and supplies the amounts of correction to the parameter coordinating subsection 72.

The parameter coordinating subsection 72 receives the image processing conditions set by the setup subsection 64; sets the image processing conditions supplied to it to the preset sites (hardware) of the prescanned image processing section 50 and the fine scanned image processing section 52; further adjusts the image processing conditions set to the respective sites in accordance with the amounts of correction of the images calculated by the key correction subsection 70 and/or calculates processing conditions for correcting the images; and sets them to the preset sites of the prescanned image processing section 50 and the fine scanned image processing section 52.

In the simultaneous printing, the parameter coordinating subsection 72 sends the identifying information of the one order for prints, which were supplied from the identifying information capturing section 66, the information of the respective frames of the one order and the image processing information of the frames to the storing means 68, and stores them in the storing means 68. Further, the parameter coordinating subsection 72 sends the identifying information to the second data conversion subsection 63. In contrast, in the reprinting, the parameter coordinating subsection 72 reads the image processing information of the frames from which reprints are created by searching the storing means 68 using the identifying information and the like captured by the identifying information capturing section 66, and supplies the image processing information to the setup subsection 64.

It is sufficient to use the frame numbers which are usually recorded to the respective frame of the film F as the information of the respective frames. Otherwise, DX codes, FNS codes, expanded DX codes and the like may be used in place of the frame numbers. The frame numbers (respective codes) may be captured, for example, by the scanner 12 (carrier 30) which counts them, by the operator who inputs them or by the carrier 30 which reads the above various kinds of the codes.

In the simultaneous printing, the identifying information capturing section 66 creates specific identifying information for identifying the one order and supplies it to the parameter coordinating subsection 72.

Whereas, in the reprinting, the identifying information of the order is captured by the operator who inputs it through the keyboard 18a or by a not shown bar code reader which reads the identifying information IDB, and supplied to the parameter coordinating subsection 72.

A method of creating the identifying information is not particularly limited. For example, an ID number, a disposition of symbols and so forth, by which a particular order can be identified from other orders, may be appropriately determined in accordance with a print date and time, a customer (customer ID) and the like. Further, the identifying information is not limited to the one which is automatically created by the identifying information capturing section 66. That is, the operator may set the identifying information using the print data and time in the same manner, inputs it through the keyboard 18a or the like, and supplies it to the identifying information capturing section 66.

Further, when a lab shop manages data as to the ID numbers of customers, the dates when the customers requested simultaneous prints and the processed numbers of the customers' requests, the lab shop can specify the film F from the combination of the data. Therefore, an appropriate combination of the data may be used as the identifying information of the film F.

Otherwise, in a (digital) photoprinter, since the image data of images can be stored as a file in a recording medium such as a floppy disc and the like, the name of the file of the images may be used as the identifying information.

The storing means 68 stores the identifying information given to the one order, the image processing information of the respective frames of the order and the information of the respective frames by causing them to correspond to each other.

The image processing information (print conditions) to be stored is image processing information for reproducing the same image processing as that employed in the previous printing, for example, the simultaneous printing such as, for example, the kinds of image processing steps applied, the sequence of the image processing steps, image processing conditions (including a parameter for reproducing the image processing conditions and data related to the parameter) and the like.

Exemplified as the image processing conditions, the parameter for reproducing the image processing conditions and the data related to the parameter are various kinds of information by which the previous image processing (conditions) can be reproduced in accordance with the image processing steps to be applied. Specifically, a LUT created for image processing, an image processing operation formula, a coefficient by which a previously determined image processing operation formula is multiplied are exemplified as the various kinds of information.

As to the image processing which is processed in the LUTs such as, for example, gray balance adjustment and data conversion to be executed in the data conversion subsection 62, it is sufficient to store the LUTs (for each of R, G and B). When the LUTs can be cascaded, they may be stored by being cascaded. As to the image processing such as saturation adjustment which can be processed by MTX operation, it is sufficient to store a MTX operation formula and a coefficient by which the MTX operation formula is multiplied.

In sharpness processing, it is sufficient to store the aforesaid sharpness gain. Dodging processing is carried out by processing image data by setting a LTU and a processing operation and by compressing and processing a dynamic range using the image data obtained through the above processing. Thus, it is sufficient to store the LTU or the processing operation.

Further, when images are corrected by the operator, image processing conditions after the correction are stored. When the processing conditions such as a LUT and the like for executing the correction is created in accordance with the image correction, they are also stored.

When the LUTs and the like are created for each of R, G and B, each of the LUTs is stored.

In the present invention, the image data itself, which is obtained by being converted in the data conversion subsection 62 of the fine scanned image processing section 52, may be stored as the above image processing information in place of the aforesaid image processing conditions and the like or in addition to them. According to this mode, the request for reprints from the customer can be accepted only by the submission of the reorder sheet without the need of the film F.

The image data may be stored by being compressed. Further, when necessary, the image data processed in the data conversion subsection 58 of the prescanned image processing section 50 may be also stored.

The storing means 68 for storing the identifying information and the image processing information may be an internal memory as shown in FIG. 3. However, it is not particularly limited and various kinds of means can be used.

For example, a recording medium such as a floppy disc, magneto-optic recording medium, IC card and the like may be used as the storing means 68. At the time, the recording medium is delivered from a lab shop to the customer together with prints. When reprints are requested, the recording medium is supplied from the customer to the lab shop together with the film F and the data stored in it is read with a drive or the like connected to the photoprinter 10.

When the lab shop creates the database of customers, the database may be used as the storing means 68. When the information is stored forever, the amount of the information is greatly increased. Thus, it is preferable to store it for a preset period of time determined appropriately. For example, a request for reprints is ordinarily made within one month from simultaneous printing, the storing period of time is preferably set to about one month from the simultaneous printing.

Otherwise, when a lab shop receives a request for reprint of the film F, the lab shop may obtain the image processing information, which was employed by other lab shop when it previously outputted prints from the film F, by accessing the database of the other lab shop by connecting the personal computer of the lab shop to a communication means such as a computer communication network, for example, a LAN or WAN (Wide Area Network) Alternatively, when simultaneous printing is carried out, the identifying information and the image processing information used in the simultaneous printing may be stored in the personal computer of the customer by using it as the storing means 68 and the image processing information may be obtained when reprinting is executed by accessing the personal computer.

As described above, the image data processed by the processing apparatus 14 is sent to the display 20 and the printer 16.

The display 20 is composed of a known display means such as a CRT (Cathode Ray Tube), liquid crystal display and the like.

The printer 16 comprises a print device (recording device) which exposes a light-sensitive material (photographic paper) in accordance with image data supplied to it so as to record a latent image on it and a processor (development device) which subjects the exposed light-sensitive material to preset processing and outputs it as prints.

In the printer 16, after the light-sensitive material is cut to a preset length in accordance with a print, information is back printed onto each of the light-sensitive materials having been cut. Subsequently, three kinds of light beams for R exposure, G exposure and B exposure, which correspond to the spectral sensitivity characteristics of the light-sensitive material, are modulated in accordance with the image data supplied from the image processing apparatus 14 and deflected in the main scanning direction as well as each light-sensitive material is transported in the auxiliary scanning direction perpendicular to the main scanning direction. With this operation, each light-sensitive material is two-dimensionally scanned and exposed with the light beams and a latent image is recorded thereon. Then, each light-sensitive material is supplied to the processor. The processor, which has received the light-sensitive material, subjects it to preset wet development processing such as color development, bleach-fixing, rinsing and so forth and dries it. Then, the processor sorts and accumulates the respective light-sensitive materials as photographic prints corresponding to a preset unit such as one piece of film.

The print system of the present invention will be described below in more detail by describing the operation of the photoprinter 10.

Figure 5:
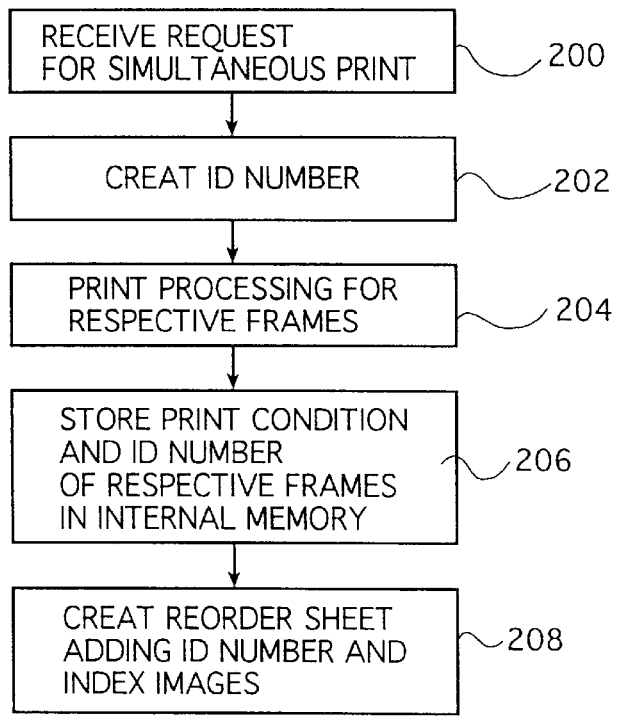
FIG. 5 is a flowchart when simultaneous print processing is carried out in the print system of the present invention.

First, a case in which the so-called simultaneous printing is carried out will be described with reference to FIG. 5.

The operator who receives the request for simultaneous printing from a customer (step 200) mounts a carrier 30, which corresponds to the film F, to the preset position of the scanner 12 and sets the film F to the preset position of the carrier 30. At the same time, the operator inputs necessary instruction and information such as a print size, customer ID, and the like through the keyboard 18a.

The information is transferred to various kinds of sites when necessary. The identifying information capturing section 66 receives necessary information and creates identifying information (ID number) for identifying the one order, that is, the film F from which prints are created in the illustrated example (step 202).

Next, when it is confirmed that the scanner 12 is in a preset conditions as to the quantity of light of the illuminant 24 and the like and the start of a print operation is instructed by the operator, print processing is carried out to respective frames (step 204).

That is, the stop value of the variable stop 26 and the accumulating time of the image sensor (line CCD sensors) 34 are set in accordance with the prescan reading conditions. Thereafter, the carrier 30 transports the film F in the auxiliary scanning direction at a speed according to prescan to thereby start the prescan. As described above, the projected light with which the film F is slit scanned is projected onto the image sensor 34, whereby the images recorded on the film F are separated into R, G and B and photoelectrically read.

The frames may be prescanned and fine scanned one by one or all the frames or a plurality of preset frames may be continuously prescanned and fine scanned. In the following description, an example in which the frames are prescanned and fine scanned one by one will be described for the simplicity of the description.

The signals output from the image sensor 34 in the prescan are amplified with the amplifier 36 and sent to the A/D converter 38 where they are converted into digital signals.

The digital signals are sent to the processing apparatus 14 and subjected to preset image processing in the data processing section 42, then converted into prescanned data with the Log converter 44 and stored in the prescan memory 46.

When the prescanned data is stored in the prescan memory 46, the setup subsection 64 reads the prescanned data; creates a density histogram and calculates an image characteristic amounts as described above; sets the reading conditions such as the stop value of the variable stop 26 and the like in the fine scanning from the result of the created histogram and the calculated amounts and in accordance with the data which is input by the operator when necessary; selects image processing steps to be executed and determines the sequence in which they are carried out; and further sets the image processing conditions used in the respective image processing steps.

The thus set image processing conditions are sent to the parameter coordinating subsection 72 which sets them to the preset sites (hardware) of the prescanned image processing section 50 and the fine scanned image processing section 52.

In the execution of examination, when the image processing conditions are set to the prescanned image processing section 50, prescanned data is read from the prescan memory 46, image processing is carried out in the prescanned image processing section 50 in accordance with the set image processing conditions; and the images of the processed prescanned data are displayed on the display 20 as simulation images (images for predicting finished images).

The operator confirms (examines) the images, that is, the result of the image processing by observing the images displayed on the display 20 and, corrects the color/density, gradation and the like of the images through the keyboard 18a and the mouse 18b when necessary.

Adjustment signals are sent to the key correction subsection 70 which calculates the amount of correction of the image processing conditions according to the input and sends the amount of correction to the parameter coordinating subsection 72. The parameter coordinating subsection 72 corrects the image processing conditions set to the prescanned image processing section 50 and the fine scanned image processing section 52 in accordance with the amount of correction sent thereto as described above. Otherwise, the parameter coordinating subsection 72 calculates processing conditions for executing the correction and sets the calculated processing conditions to the preset sites of the prescanned image processing section 50 and the fine scanned image processing section 52.

Accordingly, the images displayed on the display 20 are changed in accordance with the input executed by the operator.

When the operator determines that the images displayed on the display 20 are appropriate (examination is passed), he or she instructs to start a print operation through the keyboard 18a or the like.

With the above operation, the image processing conditions are established and fine scan is started.

The fine scan is carried out similarly to the prescan except that it is executed under the reading conditions in which the stop value of the illuminant 24 and the like are set. That is, the signals output from the image sensor 34 are amplified with the amplifier 36; converted into digital signals with the A/D converter 38; processed in the data processing section 42 of the processing apparatus 14; converted into fine scanned data with the Log converter 44; and stored in the fine scan memory 48.

Subsequently, the fine scanned data is read from the fine scan memory 48; processed under the established conditions and converted into image data corresponding to the images recorded by the printer 16 in the image processing subsection 60 and the data conversion subsection 62 of the fine scanned image processing section 52; and sent to the printer 16 so that prints are created from the fine scanned data.

At the same time, the parameter coordinating subsection 72 receives the ID number of the one order (film F) from the identifying information capturing section 66; sends the image processing information corresponding to the established image processing conditions, specifically the image processing steps to be applied, the sequence in which the image processing steps are executed and the frame information (frame numbers) of the film F, which are caused to correspond to the ID number, to the storing means 68 and stores them therein (step 206).

The fine scanned data having been processed in the image processing subsection 60 is sent also to the second data conversion subsection 63 which stores the fine scanned data by thinning out it. Further, the second data conversion subsection 63 also captures the ID number of the one order from the parameter coordinating subsection 72.

The operator carries out the examination in this example. However, when the operator does not carry out the examination, the image processing conditions are established at the time the parameter coordinating subsection 72 sets the image processing conditions, which have been set in the setup subsection 64, to the prescanned image processing section 50 and the fine scanned image processing section 52. Then, the print operation is started; the identifying information, the image processing information and the frame numbers are transferred to the storing means 68; the fine scanned data having been processed in the image processing subsection 60 is transferred to the second data conversion subsection 63; and the ID number is captured in the second data conversion subsection 63 in the same manner, respectively.

It is preferable that whether the examination is to be executed or not can be selected as a mode.

When the fine scan of a first frame is finished, the carrier 30 transports the film F and the prescan of a second frame is started. Then, image processing conditions are set and examined; the image processing conditions are established, fine scan is carried out; the ID number, the frame numbers and the image processing information are stored in the storing means 68; the fine scanned data having been processed in the image processing subsection 60 is transferred to and stored in the second data conversion subsection 63 in the same manner. Thereafter, the same processing steps are carried out to a third frame, a fourth frame . . . .

On the completion of the processing of all the frames of the film F on which the images are recorded (the output of the image data to the printer 16), the second data conversion subsection 63 converts the stored image data of the respective frames into image data which corresponds to the images recorded by the reorder sheet printer 22 and assigns the image data to the positions which correspond to the respective frames on a reorder sheet. Further, the second data conversion subsection 63 adds the image data of the captured ID number of the order or the image data of the barcode produced from the ID number to a preset position, whereby the image data for a reorder sheet as shown in FIG. 4 is created.

The thus created image data is sent to the reorder sheet printer 22 and the reorder sheet is output from the reorder sheet printer 22 and supplied to the customer together with the prints output from the printer 16 (Step 208).

In the print system of the present invention, the image processing information and the like may be stored in the storing means 68 at a time other than the execution of the simultaneous printing. For example, when the customer is not satisfied with the images of the prints which were created in response to the request for simultaneous printing and he or she requests to create reprints with the instruction for color/density processing and the like or when reprints are created from the images of the frames to which no image processing information is stored, the image processing conditions established at the time may be stored in the storing means 68.

Figure 6:
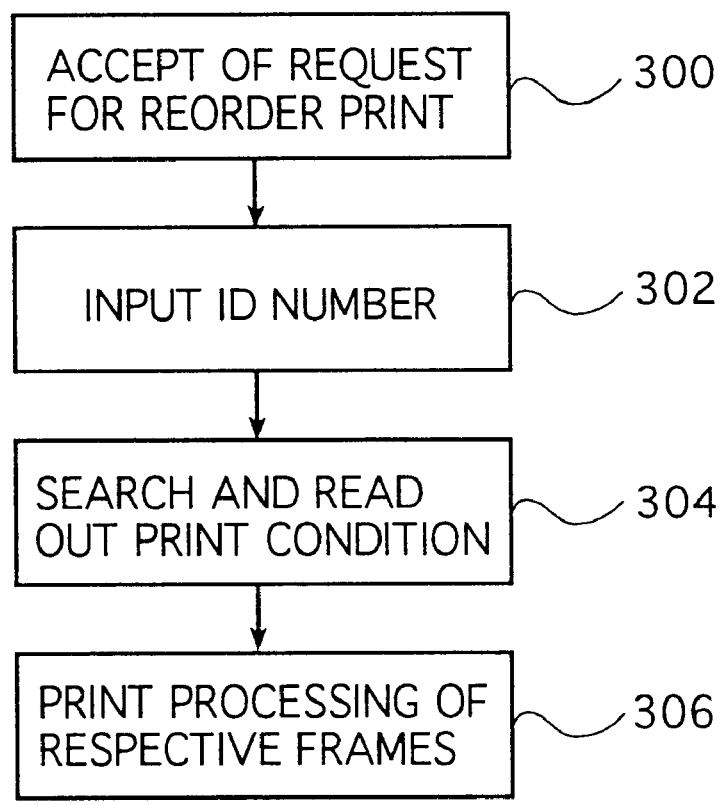
FIG. 6 is a flowchart when reprint processing is carried out in the print system of the present invention.

Next, a case in which so-called reprints are created will be described with reference to FIG. 6.

In the present invention, a request for reprints (reordered prints) is accepted when a customer submits a reorder sheet as shown in FIG. 4 on which the frames from which reprints are created and the number of the reprints are written together with the film F (step 300).

When the request for the reprints is accepted, the operator inputs that the request is made for reprints; mounts a carrier corresponding to the received film F on the scanner 12; loads the film F on the carrier; inputs the ID number recorded on the reorder sheet through the keyboard 18a or the like or inputs the ID number by reading the barcode ID recorded on the reorder sheet with a barcode reader (step 302); and instructs the frames from which the reprints are created. With this operation, the identifying information capturing section 66 captures the ID number (identifying information) of the film F (one order corresponding to the film F).

When the operator does not instruct that reprints are requested and does not input data depending upon whether identifying information is input or not, the same processing as that executed in the simultaneous printing may be carried out, whereas when the operator input the data, the processing for reprinting which will be shown below may be carried out.

Next, when the start of the print is instructed after it is confirmed that the scanner 12 is in a preset state, the film F is transported so as to transport the frame, to which the instruction for reprinting is issued, to a reading position and prescan is started.

The prescan is carried out similarly to that executed in the simultaneous printing. That is, the light projected from the film F is projected onto the image sensor 34 under prescan reading conditions. Then, the signals output from the image sensor 34 are amplified with the amplifier 36; converted into digital signals with the A/D converter 38; sent to the processing apparatus 14 and processed in the data processing section 42; converted into prescanned data with the Log converter 44; and stored in the prescan memory 46 as the prescanned data.

On the other hand, the parameter coordinating subsection 72 receives the ID number from the identifying information capturing section 66; reads the image processing information (print conditions) of the frame when it was simultaneously printed by searching the storing means 68 using the frame number of the frame, from which a reprint is created, and the ID number; and sends the image processing information to the setup subsection 64 (step 304). When the prescanned data is stored in the prescan memory 46, the setup subsection 64 creates a density histogram and calculates image characteristic values in the same manner as the simultaneous printing; determines fine scan reading conditions; sets image processing steps to be applied, the sequence in which the image processing steps are executed and image processing conditions using the image processing information read from the storing means 68, the image characteristic values and the like so that the image processing in the simultaneous printing can be reproduced; and sets them to the parameter coordinating subsection 72.

The parameter coordinating subsection 72 sets the image processing conditions and the like to the image processing subsection 60 of the fine scanned image processing section 52.

In the reprinting, the image processing conditions are basically established in the above operation, and fine scan is started. The fine scan is carried out in the same manner as the simultaneous printing. That is, the scanner 12 reads images under the thus set fine scan reading conditions, and the signals output from the image sensor 34 are amplified with the amplifier 36; converted into digital signals with the A/D converter 38, processed with the data processing section 42 and the Log converter 44; and stored in the fine scan memory 48 as fine scanned data.

When the fined scanned data is stored in the fine scan memory 48, it is read out by and sent to the fine scanned image processing section 52; processed in the image processing subsection 60 under the established image processing conditions; converted into output image data in the data conversion subsection 62; supplied to the printer 16; and prints on which the image data is reproduced are output likewise.

The image processing conditions may be set also to the prescanned image processing section 50 in the reprinting when necessary similarly to the aforesaid simultaneous printing and the operator may examine the image processing conditions by displaying simulation images on the display 20.

As apparent from the above description, the images of the reprints which are created with the photoprinter making use of the print system of the present invention are images to which the same image processing steps as those in the simultaneous printing are applied under the same image processing conditions as those of the simultaneous printing. Accordingly, the color and density of the images of the reprints are preferably matched to those of the images of the simultaneous prints.

Further, according to the present invention, image processing conditions can be reproduced by accurately reading out the image processing information used in the simultaneous printing using the identifying information and the frame number even in reprinting in which reprints are created from a film such as a negative of 135 size, which is not provided with the cartridge ID and the magnetic information employed in the Advanced Photo System. In addition, since an ordinary film is cut off to several pieces in the simultaneous printing and returned to the customer by being inserted into film sheets, even if ID numbers and the like are set and recorded to the film, the information is lost after the film is cut to the pieces. Further, even if the ID number and the like are set and recorded to the film sheets and to an accommodation bag in which the film sheets are accommodated, if films are inserted into other sheets and/or the sheets are accommodated in other accommodation bag, the image processing information does not correspond to the ID number. According to the present invention which employs the reorder sheet on which the index images and the identifying information are recorded, the above disadvantage can be overcome.

Moreover, since the customer can request reprinting while observing the index images of the reorder sheet, he or she can simply request the reprinting with fewer mistakes.

The print system of the present invention can be also preferably applied to a conventional photoprinter employing direct exposure (analog exposure), in addition to the digital photoprinter as shown in FIG. 1.

As known well, the direct exposing type photoprinter outputs a print on which an image recorded on a film is reproduced by projecting light through the image to a light-sensitive material; forming a latent image by exposing (printing) the light-sensitive material with the projected light; and subjecting the light-sensitive material to preset development processing. When the light-sensitive material is exposed with the light projected through the film, the color of the image is adjusted by inserting C (cyan), M (magenta) and Y (yellow) color filters into a light passage in an appropriate amount to reproduce an appropriate image on the print. Further, the density of the image is adjusted by adjusting the quantity of the projected light with a variable stop or the like. The amount of insertion of each filter and the amount of adjustment of the variable stop are determined by, for example, obtaining image data by photoelectrically reading the image recorded on the film and calculating the image characteristic values of the image such as a LATD, highlight, shadow and the like.

When the print system of the present invention is used in the direct exposure type photoprinter, the amount of insertion of each filter and the amount of adjustment of the variable stop in simultaneous printing are stored in a storing means as image processing information. When reprinting is carried out, the image processing information of a particular frame is read in accordance with the identifying information, frame number and the like having been captured similarly to the above example, and exposure conditions similar to those used in the simultaneous printing is reproduced, whereby reprints are output by the projection of light thereto and the exposure thereof with the projected light.

While the print system and the reorder sheet used thereto of the present invention has been described above in detail, the present invention is by no means limited to the above embodiment and it goes without saying that various improvements and modifications can be made within the range which does not depart from the gist of the invention.

As described above in detail, according to the print system and the reorder sheet used to the print system of the present invention, reprints, on which images similar to those reproduced in simultaneous printing (previous printing) can be preferably output by a simple operation. Furthermore, customers can request reprints accurately in a much simpler and more convenient manner.

What is claimed is:

1. A print method for image processing original images and outputting prints, said method comprises:

setting identifying information according to one order of print production;

storing the identifying information, image processing information which was applied to each of the original images, and information of the respective original images of said one order in storing means by causing them to correspond to each other, wherein the storing means is a database for a plurality of data sets, each data set comprised of identifying information, applied image processing information and original image information;

outputting a reorder sheet on which the original images of said one order, the identifying information and the information of the respective original images of said one order are recorded;

retrieving, when the original images are output as reprints, the image processing information of the original images by searching the storing means using the identifying information and the information of the respective original images which have been recorded on the reorder sheet; and using said retrieved image processing information to process reprints of the original images.

2. A print method according to claim 1, wherein the identifying information is arranged as a barcode, and recorded on the reorder sheet and the image processing information of the original images is read out from the storing means by reading the barcode.

3. A print method according to claim 1, wherein the image processing information comprises at least one of the kinds of image processing steps applied, the sequence of the image processing steps and image processing conditions.

4. A print method according to claim 1, wherein the original images are reproduced to the prints by digitally recording an image based on image data obtained by the image processing, and the image data obtained by the image processing is stored in the storing means.

5. A reorder sheet which is used to a print system for subjecting original images to image processing and outputting prints having the original images reproduced thereon, said reorder sheet comprising:

original images of one order of print production recorded thereon, and information of respective original images and identifying information of said one order recorded thereon, wherein, when the original images are output as reprints, said recorded information of respective original images and said identifying information is used to search for and to retrieve image processing information applied to the original images that was previously stored in a storing means, wherein the storing means is a database for a plurality of data sets, each data set comprised of identifying information, applied image processing information and original image information.

6. A print method for image processing original images and outputting prints, said method comprises:

setting identifying information according to one order of print production;

storing the identifying information, image processing information which was applied to each of the original images, and information of the respective original images of said one order in a memory by causing them to correspond to each other, wherein the memory is a database for a plurality of data sets, each data set comprised of identifying information, applied image processing information and original image information;

outputting a reorder sheet on which the original images of said one order, the identifying information and the information of the respective original images of said one order are recorded;

retrieving, when the original images are output as reprints, the image processing information of the original images by searching the memory using the identifying information and the information of the respective original images which have been recorded on the reorder sheet; and using said retrieved image processing information to process reprints of the original images.

7. A print method according to claim 6, wherein the identifying information is arranged as a barcode, and recorded on the reorder sheet and the image processing information of the original images is read out from the memory by reading the barcode.

8. A print method according to claim 6, wherein the image processing information comprises at least one of the kinds of image processing steps applied, the sequence of the image processing steps and image processing conditions.

9. A print method according to claim 6, wherein the original images are reproduced to the prints by digitally recording an image based on image data obtained by the image processing, and the image data obtained by the image processing is stored in the memory.

* * * * *